Jan. 5, 1960  H. GABLER  2,920,321
NAVIGATIONAL POSITION FINDING APPARATUS
Filed Dec. 28, 1955  2 Sheets-Sheet 1

INVENTOR.
HEINZ GABLER
BY
Mestern & Kollin
ATTORNEYS

Jan. 5, 1960 H. GABLER 2,920,321
NAVIGATIONAL POSITION FINDING APPARATUS
Filed Dec. 28, 1955 2 Sheets-Sheet 2

INVENTOR.
HEINZ GABLER
BY
Mestern & Kollin
ATTORNEYS

2,920,321

NAVIGATIONAL POSITION FINDING APPARATUS

Heinz Gabler, Hamburg-Volksdorf, Germany, assignor to Maximilian Waechtler, Sierksdorf/Post Haffkrug/Holstein, Germany Application December 28, 1955, Serial No. 555,980

5 Claims. (Cl. 343—102)

This invention concerns radio navigational position finding apparatus.

In known apparatus hitherto used for the determination of the bearing minimum—rotating—loop and goniometer direction finders—radio bearings of transmitters with identical or almost identical frequencies could be taken only one after the other. On simultaneous incidence of several signals from different azimuths, interfering voltages would arise in the receiver due to the figure-8 patterns of the loop aerials and would prevent the separate observation of the bearing minima.

The facility for displaying several signals simultaneously on a cathode ray tube, however, would make it possible to obtain a correct indication of several signals simultaneously incident from different directions and having identical or almost identical frequencies, if the respective transmitters could be keyed intermittently. At a rapid intermittent keying of, for example three transmitters, the eye of an observer would see a stationary indication of three luminous lines corresponding with the direction of the three transmitters. These lines could then be used for a double-angle measurement for the purpose of position finding of a ship in the same way as the double-angle measurement by means of a sextant towards three terrestrial objects.

According to the present invention there are provided, in radio-navigational apparatus wherein a plurality of transmitters each provided with a keying device radiate signals adapted to be displayed on a cathode ray tube, means associated with each keying device for causing said device to produce a keying interval of different length from the intervals produced by the remaining keying devices, and means for synchronously driving said keying devices.

There is provided an arrangement for direction finding without the aid of a compass, which employs a visual direction finder according to the two-channel principle and transmitters which are fully independent from one another in their keying and which operate on the same or approximately the same frequencies. In the arrangement there is attained an independence of the transmitters from one another through a selection of switching intervals of the three transmitters, the intervals consisting of a one third mark period and a two thirds space period for the different transmitters.

The driving means for the keying devices may comprise synchronous motors which are preferably fed from frequency regulated alternating-current sources of identical nominal frequency, local synchronisation of the keying devices being effected, if necessary, by high precision clockwork means.

According to a further feature of the invention, where there are $n$ transmitters in use, the mark to space ratio of the keying intervals is advantageously made $$\frac{1}{n} \text{ to } \frac{n-1}{n}$$

and the keying devices are so operated as to produce a number of keying intervals sufficiently high to render the lines displayed on the cathode ray tube visually permanent. The principle of the invention will now be explained for three transmitters which are positioned in different azimuths.

The difference between the individual keying device required for the three transmitters and driven by means of synchronous motors from three separate alternating-current mains of 50 c./s., is that the keying intervals which they produce, consisting of ⅓ mark period and ⅔ space period, must be of different lengths for the different transmitters. Thus it is effected that during the operation of the three transmitters, a periodic displacement of the mark periods and space periods is obtained, in such a way that in a certain interval, for example 1 second, each transmitter is keyed alone for several times or together with the second or with the third transmitter or simultaneously together with the second and third transmitter, or that there are pure breaks in keying.

In the accompanying drawing.

Figure 1:
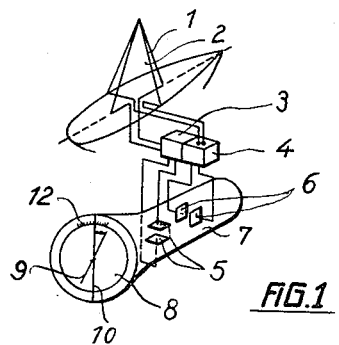
Fig. 1 is a diagrammatic view of the direction finder.

When a direction is found with the aid of the visual direction finder according to the two-channel principle as is shown in Fig. 1, the direction is shown as a line on the cathode ray tube screen, the direction of the line forming the same angle as the direction of the wave which strikes the reference direction of the antenna system.

In the arrangement according to Fig. 1, numerals 1 and 2 represent the cross-pieces of a cross frame in which cross-piece 1 is installed in amidships direction and cross-piece 2 across the ship. The frequencies delivered by both cross-pieces are increased in strength by amplifiers 3 and 4 and are led to deflection plate pairs 5 and 6 of a cathode ray tube. The direction of the striking transmitter S which is at an angle to the forward part of the ship, then appears as a luminous diametrically disposed line 9 on the screen 8 of the cathode ray tube 7. This line forms the same angle (which can be read on the concentric scale 1) with reference to an indicating point 10 (0 position), as that of the transmitter S with respect to the forward part of the ship. In installing such a device on a ship, it is also necessary, in order to evaluate the direction finding on a ship's chart, to know the course along which the ship is being steered. When it is desired to find a position, the direction must be found by means of two transmitters which are disposed in different azimuths. It is possible to be independent of knowing the course of the ship, as well as from a compass, if three directions are indicated simultaneously and the angle between these directions is directly determined. This method of location finding without the aid of a compass is employed in terrestrial navigation, in which the angle between the three objects may be ascertained by means of a sextant.

Figure 2:
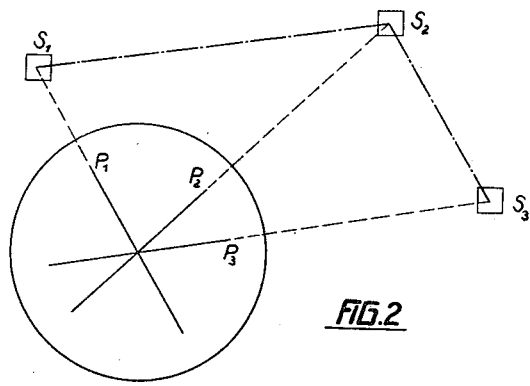
Fig. 2 illustrates diagrammatically the disposition of stations with three transmitters.

A method of location finding without the aid of a compass by means of three transmitters is shown schematically in Fig. 2. In figure, characters $S_1$, $S_2$ and $S_3$ indicate the three transmitters and $P_1$, $P_2$ and $P_3$ their corresponding direction indications on the cathode ray tube. In order to make the three transmitters appear on the screen of the cathode ray tube as three intersecting lines, it is necessary that transmitters $S_1$, $S_2$ and $S_3$ transmit one after another in such a quick sequence, that each individual direction will appear as a persisting line.

Figure 3:
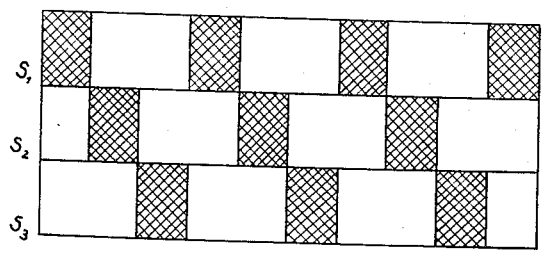
Fig. 3 is a transmission diagram of a group of mutually connected transmitters.

In order to assure the necessary transmitter operation, these must be linked with one another by wire or by wireless linking means to thereby assure the necessary time intervals for the separate transmission sequences. A diagram of such a group of three transmitters is shown in Fig. 3. In this figure, the transmitting mark periods are indicated by intersecting lines and the space periods are unshaded. Since the ascertaining of position without the use of a compass by the employment of transmitter groups which are dependent on one another through cable or wireless connections is technically very difficult and requires very great technical effort, this method has not found universal application until the present. In particular, it cannot be employed when individual transmitters of a transmitter group are installed on ships. According to the present invention, a transmitter arrangement for individual transmitters is disclosed, by which a simultaneous indication from, e.g., three directions is possible, wherein, however the individual transmitters are fully independently keyed from one another. The realization of the measure according to the invention for keying the transmitters is shown in an example, wherein three transmitters are employed.

Figure 4:
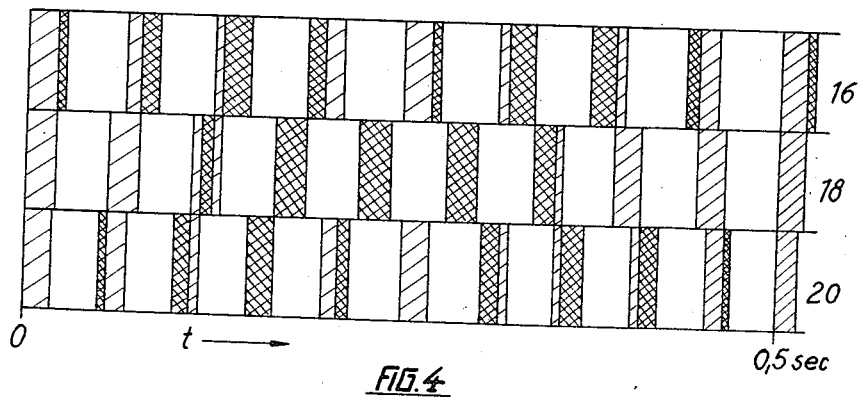
Fig. 4 is another such diagram.

Fig. 4 illustrates the keying characteristics of the three transmitters for a time of 1 second. For the first transmitter 16 keying intervals per second are chosen, for the second 18 and for the third 20. As each keying interval consists of 1/3 mark period and 2/3 space period, there results the illustrated distribution of transmitting times. All undisturbed transmitting times (each transmitter alone) are shown as crossed lines. Between both there are also breaks in keying, when no transmitter is keyed at all. The efficiency obtained by the intermittent keying, i.e. undisturbed transmitting times, is 50% in the given example. According to the number of transmitters which are to be keyed intermittently, the most favourable distribution of keying intervals, in order to obtain the highest possible efficiency, will naturally be chosen.

Figure 5:
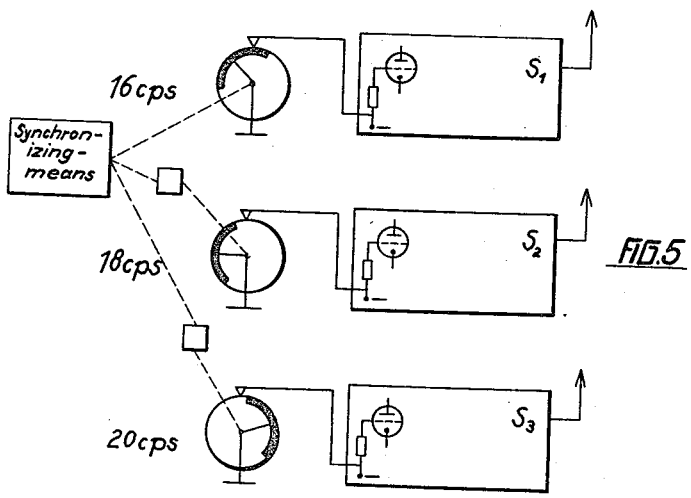
Fig. 5 is a schematic representation of an arrangement for keying three transmitters.

In Fig. 5 there is shown diagrammatically an arrangement for the keying of three transmitters. The individual transmitters are keyed through equal contact segments (shown in black) which are arranged on a rotor which in each case extend over a third of the circumference, since each switching point consists of a one third mark period and a two thirds space period. The space periods of various lengths for the individual transmitters are obtained by giving the individual rotors different revolution speeds, for instance the keying speeds in Fig. 4 have a ratio of 16:18:20.

I claim:

1. In radio-navigational position finding apparatus wherein a plurality of transmitters each provided with a keying device radiate signals adapted to be displayed on a cathode ray tube, means associated with each keying device for causing said device to produce a keying interval of different length from the intervals produced by the remaining keying devices, said means being arranged in a manner to make said transmitters independent from one another, means for synchronously driving said keying devices, and a single cathode-ray tube for the display of said signals.

2. In radio-navigational position finding apparatus wherein a plurality of transmitters each provided with a keying device radiate signals adapted to be displayed on a cathode ray tube, means associated with each keying device for causing said device to produce a keying interval of different length from the intervals produced by the remaining keying devices, said means being arranged in a manner to make said transmitters independent from one another, synchronous motor means for driving each keying device, said motor means being fed from frequency-regulated, alternating current mains of identical nominal frequency, and a single cathode-ray tube for the display of said signals.

3. In a radio-navigational position finding apparatus wherein a plurality of transmitters each provided with a keying device radiate signals adapted to be displayed on a cathode ray tube, means associated with each keying device for causing said device to produce a keying interval of different length from the intervals produced by the remaining keying devices, said means being arranged in a manner to make said transmitters independent from one another, means for driving said keying devices, high precision clockwork means for effecting local synchronisation of said keying devices, and a single cathode-ray tube for the display of said signals.

4. In radio-navigational position finding apparatus wherein $n$ transmitters each provided with a keying device radiate signals adapted to be displayed on a cathode ray tube, means associated with each keying device for causing said device to produce a keying interval of different length from the intervals produced by the remaining keying devices, said means being arranged in a manner to make said transmitters independent from one another, said means dividing said keying interval in a mark to space ratio of $$\frac{1}{n} \text{ to } \frac{n-1}{n}$$

means for synchronously driving said keying devices, and a single cathode ray tube for the display of said signals.

5. In radio-navigational position finding apparatus wherein a plurality of transmitters each provided with a keying device radiate signals adapted to be displayed on a cathode ray tube, means associated with each keying device for causing said device to produce a keying interval of different length from the intervals produced by the remaining keying devices, said means being arranged in a manner to make said transmitters independent from one another, means for synchronously driving said keying devices so as to produce a number of keying intervals sufficiently high to render the lines displayed on the cathode ray tube visually permanent, and a single cathode-ray tube for the display of said signals.

References Cited in the file of this patent

UNITED STATES PATENTS

| | | |
|---|---|---|
| 2,403,626 | Wolff | July 9, 1946 |
| 2,419,525 | Alford | Apr. 29, 1947 |
| 2,429,630 | Kandoian | Oct. 28, 1947 |
| 2,436,376 | Bown | Feb. 24, 1948 |